United States Patent
Hua

(10) Patent No.: US 9,997,878 B1
(45) Date of Patent: Jun. 12, 2018

(54) LIGHTWEIGHT BUSBAR FOR HIGH VOLTAGE BATTERY APPLICATIONS

(71) Applicant: GM GLOBAL TECHNOLOGY OPERATIONS LLC, Detroit, MI (US)

(72) Inventor: Charles Hua, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/446,608

(22) Filed: Mar. 1, 2017

(51) Int. Cl.
  *H01R 25/00* (2006.01)
  *H01R 25/14* (2006.01)
  *H01R 43/20* (2006.01)

(52) U.S. Cl.
  CPC .......... *H01R 25/145* (2013.01); *H01R 43/20* (2013.01)

(58) Field of Classification Search
  CPC . H01R 25/145; H01R 43/20; H01L 23/49524; H01F 7/1205; B21C 3/14
  See application file for complete search history.

(56) References Cited

U.S. PATENT DOCUMENTS 3,854,193 A * 12/1974 Yamaguchi ............... B21C 3/14
                                                228/130
5,578,979 A * 11/1996 Adams .................. H01F 7/1205
                                                335/245
8,022,558 B2 * 9/2011 Law .................. H01L 23/49524
                                                257/666

* cited by examiner

*Primary Examiner* — Jean F Duverne
(74) *Attorney, Agent, or Firm* — Quinn IP Law

(57) ABSTRACT

According to aspects of the present disclosure, a lightweight busbar includes an aluminum body, a copper connector, and a cladded interface. The aluminum body defines a first end and a second end opposite the first end. The copper connector is disposed proximate the first end of the aluminum body. The copper connector is configured to be fastened to an external component. The cladded interface bonds the copper connector to the first end of the aluminum body. The cladded interface inhibits yield between aluminum and copper during thermal cycling.

18 Claims, 3 Drawing Sheets

LIGHTWEIGHT BUSBAR FOR HIGH VOLTAGE BATTERY APPLICATIONS

INTRODUCTION

The disclosure relates to the field of high-voltage busbars and, more specifically, to systems and methods employing lightweight busbars.

High-end motor systems such as those used in hybrid vehicles are often controlled using one or more high-power modules. Power components can be mounted (e.g., soldered) on DBC (Direct Bond Copper) substrates, which comprise copper layers with an insulating ceramic layer sandwiched in between.

Copper busbars, typically shaped as thick bars of copper, provide electrical communication with external systems. The busbars are connected to the other system components using, for example, bolts. Beneficially, bolted joints connecting copper to copper provide robust joining because the matching coefficients of thermal expansion do not make one component yield to the other.

Aluminum busbars provide an alternative to copper busbars. However, bolted joints connecting aluminum to copper will cause the aluminum to yield when subjected to thermal cycling. Additionally, the interface between aluminum and copper at the bolted joint creates additional drawbacks when subjected to corrosive elements and vibration such as are present in moving objects. Accordingly, aluminum busbars are not used in industries such as automotive and aerospace industries.

SUMMARY

It is desirable to provide a lightweight busbar that avoids interfacing aluminum and copper at bolted joints. Beneficially, lightweight busbars according to the present disclosure reduce overall weight of the busbar, reduces material cost of manufacturing the busbar, and avoids bolted connections between disparate materials.

According to aspects of the present disclosure, a lightweight busbar includes an aluminum body, a copper connector, and a cladded interface. The aluminum body defines a first end and a second end opposite the first end. The copper connector is disposed proximate the first end of the aluminum body. The copper connector is configured to be fastened to an external component. The cladded interface bonds the copper connector to the first end of the aluminum body. The cladded interface inhibits yield between aluminum and copper during thermal cycling.

According to further aspects of the present disclosure, the copper connector envelops the first end of the aluminum body and extends toward a center of the aluminum body. The center extends between the first end and the second end of the aluminum body.

According to further aspects of the present disclosure, the lightweight busbar further includes a plurality of surfaces. Each of the plurality of surfaces includes a first portion defined by the aluminum body and a second portion defined by the copper connector. Each of the plurality of surfaces is generally planar.

According to further aspects of the present disclosure, the lightweight busbar further includes a second copper connector and a second cladded interface. The second copper connector is disposed proximate to the second end of the aluminum body. The second copper connector is configured to be fastened to a second external component. The second cladded interface bonds the second copper connector to the second end of the aluminum body. The second cladded interface inhibits yield between aluminum and copper during thermal cycling.

According to further aspects of the present disclosure, the first end of the aluminum body includes a plurality of first extensions extending toward the copper connector, the copper connector includes a plurality of second extensions extending toward the first end of the aluminum body, and the plurality of first extensions are received between respective pairs of the plurality of second extensions.

According to further aspects of the present disclosure, the first end of the aluminum body envelops a portion of the copper connector.

According to further aspects of the present disclosure, the cladded interface consists essentially of copper, aluminum, and intermetallic alloys thereof.

According to aspects of the present disclosure, a vehicle includes an electrical power source, a copper terminal, and a lightweight busbar. The copper terminal is electrically coupled to the electrical power source. The lightweight busbar includes an aluminum body, a copper connector, and a cladded interface. The aluminum body defines a first end and a second end opposite the first end. The copper connector is disposed proximate the first end of the aluminum body. The copper connector is fastened to the copper terminal. The cladded interface bonds the copper connector to the first end of the aluminum body. The cladded interface inhibits yield between aluminum and copper during thermal cycling by the electrical power source.

According to further aspects of the present disclosure, the copper connector envelops the first end of the aluminum body and extends toward a center of the aluminum body. The center extends between the first end and the second end of the aluminum body.

According to further aspects of the present disclosure, the lightweight busbar further includes a plurality of surfaces. Each of the plurality of surfaces includes a first portion defined by the aluminum body and a second portion defined by the copper connector. Each of the plurality of surfaces is generally planar.

According to further aspects of the present disclosure, the lightweight busbar further includes a second copper connector and a second cladded interface. The second copper connector is disposed proximate the second end of the aluminum body. The second copper connector configured to be fastened to a second external component. The second cladded interface bonds the second copper connector to the second end of the aluminum body. The second cladded interface inhibits yield between aluminum and copper during thermal cycling.

According to further aspects of the present disclosure, the first end of the aluminum body includes a plurality of first extensions extending toward the copper connector, and the copper connector includes a plurality of second extensions extending toward the first end of the aluminum body. Each of the plurality of first extensions is received between respective pairs of the plurality of second extensions.

According to further aspects of the present disclosure, the first end of the aluminum body envelops a portion of the copper connector.

According to further aspects of the present disclosure, the cladded interface consists essentially of copper, aluminum, and intermetallic alloys thereof.

According to aspects of the present disclosure, a method of forming a busbar includes obtaining an aluminum body defining a first end and a second end opposite the first end, disposing a copper connector proximate the first end of the aluminum body and bonding the first end of the aluminum body to the copper connector using a cladding process to form a cladded interface therebetween to inhibit yield between aluminum and copper during thermal cycling. The copper connector is configured to be fastened to a copper terminal.

According to further aspects of the present disclosure, bonding the first end of the aluminum body to the copper connector includes enveloping the first end of the aluminum body with the copper connector.

According to further aspects of the present disclosure, the busbar includes a plurality of surfaces. Each of the plurality of surfaces includes a first portion defined by the aluminum body and a second portion defined by the copper connector. Each of the plurality of surfaces is generally planar.

According to further aspects of the present disclosure, the method further includes disposing a second copper connector proximate the second end of the aluminum body and bonding the second end of the aluminum body to the second copper connector using the cladding process or another cladding process to form a second cladded interface therebetween to inhibit yield between aluminum and copper during thermal cycling. The second copper connector is configured to be fastened to a second copper terminal.

According to further aspects of the present disclosure, the first end of the aluminum body includes a plurality of first extensions extending therefrom and the copper connector includes a plurality of second extensions extending therefrom. Disposing the copper connector proximate the first end of the aluminum body includes arranging the plurality of first extensions and the plurality of second extensions in an alternatingly stacked configuration. The cladded interface is formed between each of the plurality of first extensions and respective ones of the plurality of second extensions.

According to further aspects of the present disclosure, the cladded interface consists essentially of copper, aluminum, and intermetallic alloys thereof.

The above features and advantages and other features and advantages of the present disclosure are readily apparent from the following detailed description when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
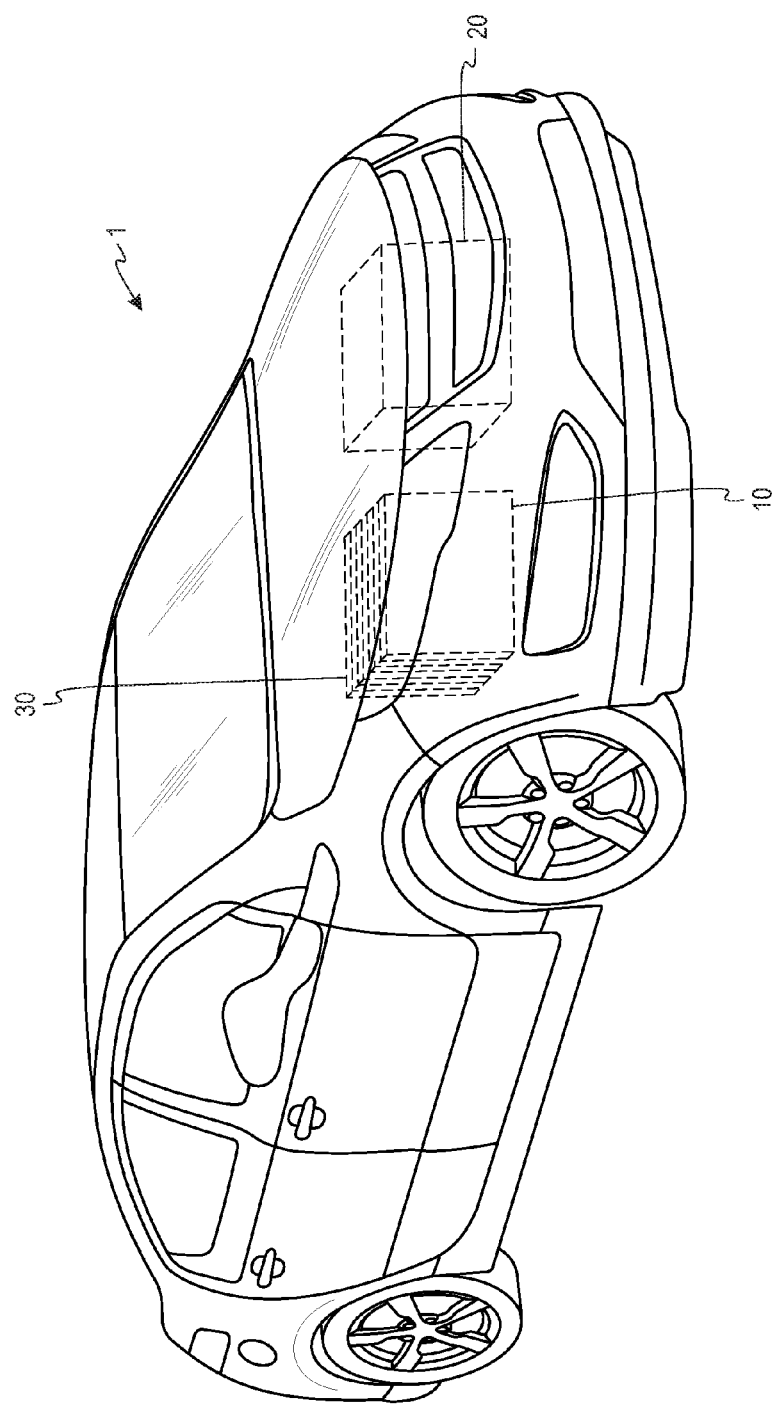
FIG. 1 is a schematic perspective view of a vehicle having a lightweight busbar, according to aspects of the present disclosure.

Referring now to FIG. 1, a vehicle 1 having lightweight busbars 100 (FIG. 2) is shown. The vehicle 1 can be, for example, a hybrid electric vehicle, a plug-in hybrid electric vehicle, a plug-in fully electric vehicle, a fuel-cell powered vehicle, and the like. In some aspects, the vehicle 1 includes a hybrid propulsion system including an electrical power source 10 and an internal combustion engine 20. The illustrated electrical power source 10 is a battery pack including a plurality of battery modules 30. In some aspects, the battery pack includes about two hundred battery modules 30, although additional or fewer cells may be needed depending on the power required. In some aspects, the vehicle 1 is fully electric and does not include the internal combustion engine 20.

Figure 2:
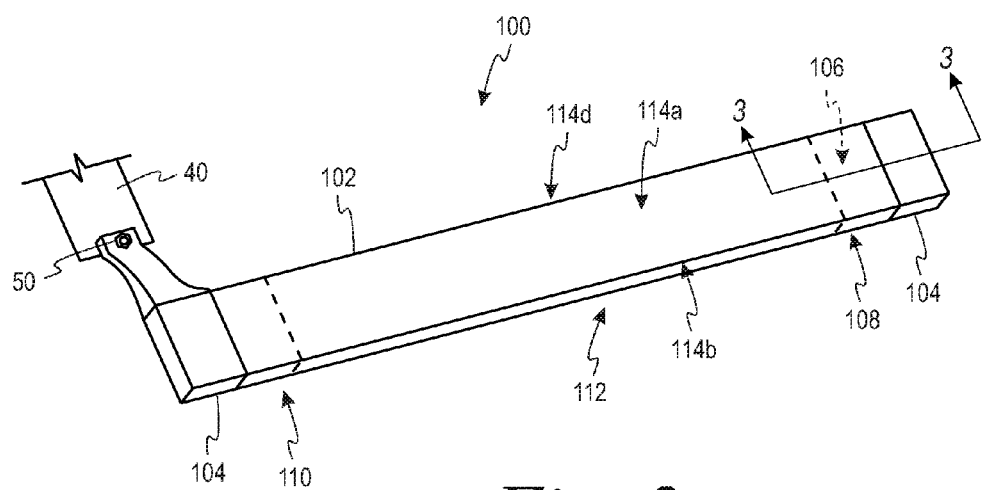
FIG. 2 is a schematic perspective view of the lightweight busbar of FIG. 1.

The vehicle 1 includes an electrical power source 10, copper terminals 40 (FIG. 2), one or more parasitic components (not shown) such as an electric motor, and the lightweight busbar 100 (FIG. 2). The lightweight busbar 100 electrically couples the electrical power source 10 to one or more parasitic components. The lightweight busbar is directly attached to copper terminals 40 that are electrically coupled to the electrical power source 10 and the one or more parasitic components. During operation, the lightweight busbar 100 transfers current received from the electric power source 10 to at least one of the one or more parasitic components. The electrical power source 10 is configured to provide an electromotive force to the vehicle 1 using, for example, the electric motor.

FIG. 2 illustrates a lightweight busbar 100. The lightweight busbar 100 includes an aluminum body 102, copper connectors 104, and a cladded interface 106 therebetween. The lightweight busbar 100 defines a first end 108 opposite a second end 110. The copper connectors 104 are disposed proximate the first end 108 and the second end 110 of the aluminum body 102 such that an electrical connection can be formed therebetween. Electrical connections between external devices and the lightweight busbar 100 are made using any known methods such as wire bonding, direct soldering, or fasteners. In some aspects, the copper connectors 104 are configured to be removably fastened to copper terminals 40 using fasteners such as bolts 50.

The cladded interface 106 bonds the copper connectors to the first end and the second end 110 of the aluminum body 102. The cladded interface inhibits yield between aluminum and copper during thermal cycling that occur during, for example, charging and discharging cycles. In some aspects, the cladded interface consists essentially of copper, aluminum, and intermetallic alloys thereof. Beneficially, the cladded interface 106 provides predetermined contact areas between copper and aluminum, as well as providing known intermetallic alloys such that the electrical properties of the interface between aluminum and copper can be optimized and known throughout the useful life of the lightweight busbar 100. The cladded interface 106 can be created using any of a number of cladding processes such as extruding, pressing, rolling, or fusion welding portions of the aluminum body 102 together with portions of the copper connectors 104.

In some aspects, the copper connectors 104 envelop the first end 108 and the second end 110 of the aluminum body 102 and extend toward a center 112 of the aluminum body 102. The lightweight busbar 100 includes a plurality of surfaces 114a-d, each of which includes a first portion 116a defined by the aluminum body 102 and a second portion 116b defined by the copper connector 104. In some aspects, each of the plurality of surfaces 114a-d is generally planar to provide substantially uniform packaging between the aluminum body 102 and the copper connectors 104. Beneficially, the cladded interface 106 of the lightweight busbar 100 provides for low-profile packaging to decrease the overall volume occupied by the lightweight busbar 100. In some aspects, the low-profile packaging is provided by avoiding additional materials such as flux and welds.

Figure 3:
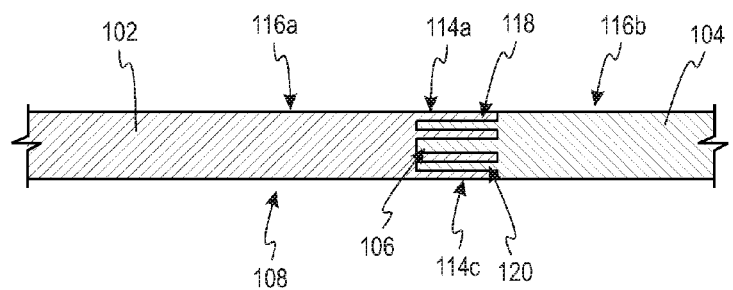
FIG. 3 is a schematic cross-sectional view of the lightweight busbar of FIG. 2, taken along section line 3-3.

FIG. 3 shows the cladded interface 106 of the lightweight busbar 100 in cross-section according to some aspects of the disclosure. In the illustrated figure, the first end 108 of the aluminum body 102 includes a plurality of first extensions 118 extending therefrom, and the copper connector 104 includes a plurality of second extensions 120 extending therefrom. The first extensions 118 and second extensions 120 are alternatingly stacked such that the plurality of first extensions 118 are received between respective pairs of the plurality of second extensions 120 and the cladded interface 106 is formed therebetween. Beneficially, the plurality of first extensions 118 and the plurality of second extensions 120 can be sized and shaped to further inhibit yield between the aluminum and the copper during thermal cycles and thereby improve robustness of the interface between the aluminum and the copper.

Figure 4:
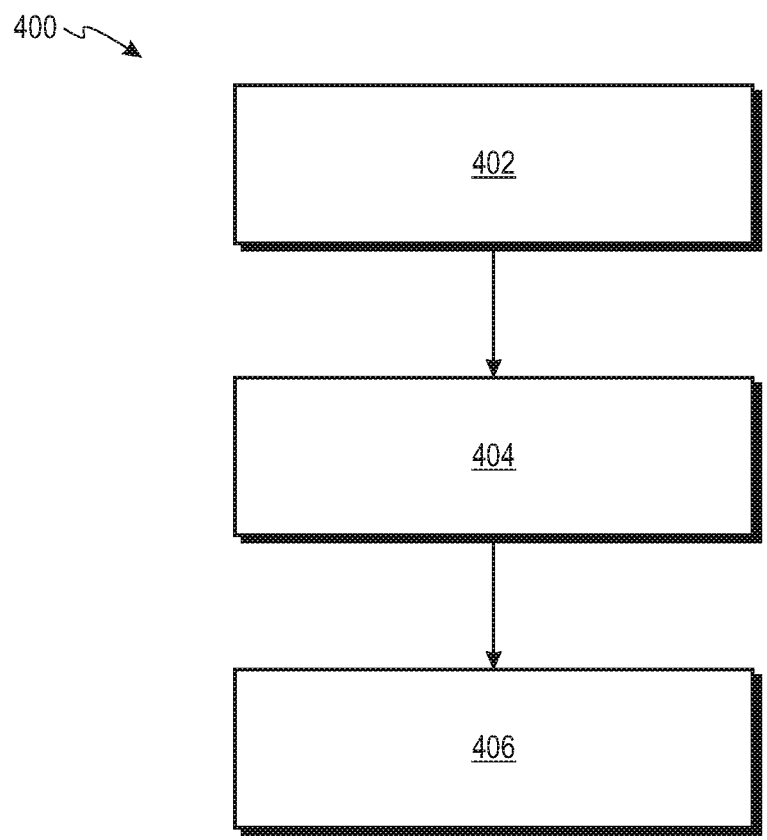
FIG. 4 is a flowchart of a method of forming a lightweight busbar, according to aspects of the present disclosure.

FIG. 4 illustrates the method 400 of forming the lightweight busbar 100. The method 400 includes obtaining 402 an aluminum body 102 defining the first end 108 opposite the second end 110, disposing 404 the copper connector 104 proximate the first end 108 of the aluminum body 102, and bonding 406 the first end 108 of the aluminum body 102 to the copper connector 104 using the cladding process to form the cladded interface 106 therebetween to inhibit yield between aluminum and copper during thermal cycling.

In some aspects, the interface may be a welded interface using methods such as ultrasonic welding, reaction metallurgical joining, and the like.

While the best modes for carrying out the disclosure have been described in detail, those familiar with the art to which this disclosure relates will recognize various alternative designs and embodiments for practicing the disclosure within the scope of the appended claims.

What is claimed is:

1. A lightweight busbar comprising:
   an aluminum body defining a first end and a second end opposite the first end;
   a copper connector disposed proximate the first end of the aluminum body, the copper connector being configured to be fastened to an external component; and
   a cladded interface bonding the copper connector to the first end of the aluminum body, the cladded interface inhibiting yield between aluminum and copper during thermal cycling,
   wherein the first end of the aluminum body envelops a portion of the copper connector.

2. The lightweight busbar of claim 1, wherein the copper connector envelops the first end of the aluminum body and extends toward a center of the aluminum body, the center extending between the first end and the second end of the aluminum body.

3. The lightweight busbar of claim 2, further comprising a plurality of surfaces, wherein each of the plurality of surfaces includes a first portion defined by the aluminum body and a second portion defined by the copper connector, and each of the plurality of surfaces is generally planar.

4. The lightweight busbar of claim 1, further comprising:
   a second copper connector disposed proximate the second end of the aluminum body, the second copper connector being configured to be fastened to a second external component; and
   a second cladded interface bonding the second copper connector to the second end of the aluminum body, the second cladded interface inhibiting yield between aluminum and copper during thermal cycling.

5. The lightweight busbar of claim 1, wherein the first end of the aluminum body includes a plurality of first extensions extending toward the copper connector, the copper connector includes a plurality of second extensions extending toward the first end of the aluminum body, and the plurality of first extensions are received between respective pairs of the plurality of second extensions.

6. The lightweight busbar of claim 1, wherein the cladded interface consists essentially of copper, aluminum, and intermetallic alloys thereof.

7. A vehicle comprising:
   an electrical power source;
   a copper terminal electrically coupled to the electrical power source; and
   a lightweight busbar including:
     an aluminum body defining a first end and a second end opposite the first end;
     a copper connector disposed proximate the first end of the aluminum body, the copper connector fastened to the copper terminal; and
     a cladded interface bonding the copper connector to the first end of the aluminum body, the cladded interface inhibiting yield between aluminum and copper during thermal cycling by the electrical power source.

8. The vehicle of claim 7, wherein the copper connector envelops the first end of the aluminum body and extends toward a center of the aluminum body, the center extending between the first end and the second end of the aluminum body.

9. The vehicle of claim 7, wherein the lightweight busbar further includes a plurality of surfaces, each of the plurality of surfaces including a first portion defined by the aluminum body and a second portion defined by the copper connector, and each of the plurality of surfaces is generally planar.

10. The vehicle of claim 7, wherein the lightweight busbar further includes:
    a second copper connector disposed proximate the second end of the aluminum body, the second copper connector configured to be fastened to a second external component; and
    a second cladded interface bonding the second copper connector to the second end of the aluminum body, the second cladded interface inhibiting yield between aluminum and copper during thermal cycling.

11. The vehicle of claim 7, wherein the first end of the aluminum body includes a plurality of first extensions extending toward the copper connector, the copper connector includes a plurality of second extensions extending toward the first end of the aluminum body, and the plurality of first extensions are received between respective pairs of the plurality of second extensions.

12. The vehicle of claim 7, wherein the first end of the aluminum body envelops a portion of the copper connector.

13. The vehicle of claim 7, wherein the cladded interface consists essentially of copper, aluminum, and intermetallic alloys thereof.

14. A method of forming a busbar comprising:
    obtaining an aluminum body defining a first end and a second end opposite the first end;
    disposing a copper connector proximate the first end of the aluminum body, the copper connector configured to be fastened to a copper terminal; and
    bonding the first end of the aluminum body to the copper connector using a cladding process to form a cladded interface therebetween to inhibit yield between aluminum and copper during thermal cycling,
    wherein the first end of the aluminum body comprises a plurality of first extensions extending therefrom, the copper connector includes a plurality of second extensions extending therefrom, disposing the copper connector proximate the first end of the aluminum body includes arranging the plurality of first extensions and the plurality of second extensions in an alternatingly stacked configuration, and the cladded interface is formed between each of the plurality of first extensions and respective ones of the plurality of second extensions.

15. The method of claim 14, wherein bonding the first end of the aluminum body to the copper connector includes enveloping the first end of the aluminum body with the copper connector.

16. The method of claim 14, wherein the busbar includes a plurality of surfaces, each of the plurality of surfaces including a first portion defined by the aluminum body and a second portion defined by the copper connector, and each of the plurality of surfaces being generally planar.

17. The method of claim 14, further comprising:
disposing a second copper connector proximate the second end of the aluminum body, the second copper connector configured to be fastened to a second copper terminal; and
bonding the second end of the aluminum body to the second copper connector using the cladding process or another cladding process to form a second cladded interface therebetween to inhibit yield between aluminum and copper during thermal cycling.

18. The method of claim 14, wherein the cladded interface consists essentially of copper, aluminum, and intermetallic alloys thereof.

* * * * *